United States Patent
O'Heir

[11] Patent Number: 5,924,908
[45] Date of Patent: Jul. 20, 1999

[54] BALL TOY FOR CHILDREN AND CATS

[76] Inventor: Brian Sean O'Heir, 551 Everett La., Clarkdale, Ariz. 86324

[21] Appl. No.: 08/896,180

[22] Filed: Jul. 17, 1997

[51] Int. Cl.[6] .............................. A63H 15/00; A01K 29/00
[52] U.S. Cl. ............................. 446/168; 119/707; 434/258
[58] Field of Search ...................................... 446/168, 170; 119/706, 707; 434/258, 259; 482/45, 110; 273/447; D21/92

[56] References Cited

U.S. PATENT DOCUMENTS

| | | | |
|---|---|---|---|
| 3,648,403 | 3/1972 | Gommel | 446/168 X |
| 4,593,911 | 6/1986 | Cory | 446/170 X |
| 5,529,017 | 6/1996 | Udelle et al. | 446/168 X |

FOREIGN PATENT DOCUMENTS

| | | | |
|---|---|---|---|
| 636754 | 2/1962 | Canada | 446/170 |

*Primary Examiner*—Robert A. Hafer
*Assistant Examiner*—Laura Fossum

[57] ABSTRACT

A child and cat toy consisting of an enclosure having a least one opening defined by a rim edge projecting toward the interior of the enclosure. The enclosure contains at least one ball with a diameter small enough to pass freely through the opening. In operation the user attempts to remove the ball from the enclosure. The ball is restrained from rolling out through the opening by the curvature or step of the rim edge. The removal of the ball can be further hampered by interference from an additional ball, and by various geometric characteristics of the enclosure. Various embodiments of the present invention utilizing different enclosure geometries, number of openings, and number of balls are disclosed having utility for specifically entertaining various aged children and cats.

20 Claims, 7 Drawing Sheets

BALL TOY FOR CHILDREN AND CATS

BACKGROUND — FIELD OF INVENTION

This invention relates generally to a toy for entertaining small children and domestic cats. More specifically, it relates to an enclosure containing one or more restrained, but not captured, and seemingly free balls which a child or cat can play with by attempting the removal of the ball or balls.

BACKGROUND—DESCRIPTION OF PRIOR ART

Small children and cats are similarly inquisitive, verbally limited, and present some of the same challenges regarding their entertainment. Their natural proclivities for exploration and control should be addressed in toy design. Exploiting these areas minimizes the need for instruction in using the toy.

Beyond their inquisitive similarities children are more intelligent, quicker to learn, and more dexterous than cats. Their natural tendency when presented with a pleasing object is to handle it for better inspection. Extracting an object from a container is a natural challenge for a small child. Exploitation of this tendency for entertainment and mental stimulation of the child has been poor. Most toys of the enclosure and content variety offer no opportunity for the content to be removed. The child quickly realizes there is no chance for success at retrieving the content and loses interest in the toy. One toy that does address the entertaining cycle of content removal and reinsertion is U.S. Pat. No. 3,648,403, filed Jan. 30, 1970 by Harry L. Gommel, and entitled "Play Toy For Felines, Dogs, And Children".

Further, toys for young children often stimulate by noise rather than challenge and intrigue. Many others require an understanding of some obscure objective appreciated only by an adult. Often instruction is required, most particularly assembly, an activity contrary to the natural disassembly tendencies of young children.

The inquisitive cat lacks the dexterity of children and is limited to pawing and swatting objects of amusement. As with enclosure and content toys for children the cat varieties also offer little opportunity for the content to be removed. The cat also quickly realizes there is no chance for success and loses interest in the toy. One cat toy that does address content removal is U.S. Pat. No. 5,351,650, filed Sep. 30, 1993 by David A. Graves, and entitled "Cat Toy".

Also, many cat toys, like children toys, stimulate with noise rather than intrigue. Cat toys are often fixed to a post or other immobile object and constructed of materials that lack durability.

OBJECTS AND ADVANTAGES

What is needed is an enclosure and content type toy which offers the user an enticing and challenging opportunity for removing the content.

The primary object of the present invention is to provide an enclosure and content toy containing a ball or balls which are tactually accessible, and seemingly easy to remove. In reality ball removal is far more difficult, but quite possible. Thus, the users find themselves with a compelling challenge which is periodically supported by success. It is a further object to provide a toy which is colorful, dynamic, and physically challenging, while not being excessively noisy.

A still further object is to provide a toy which is simple in structure, durable, and inexpensive to manufacture.

Additional objects and advantages are apparent from consideration of the following description with reference to the accompanying drawings.

SUMMARY OF THE INVENTION

In brief, the invention disclosed herein comprises a transparent or translucent plastic cylindrical, spherical, or torroidal enclosure perforated with one or more openings. Each opening is defined by an arcuate rim edge curving toward the interior of the enclosure. The enclosure contains one or more balls, each having a diameter small enough to freely pass through any enclosure opening.

The operational objective of the toy is to remove the ball or balls through an opening. This is hampered primarily by the curvature of the rim edge, which permits the ball or balls to easily roll right up to the opening but not further. In order for the ball to roll through the opening it must roll over the rim edge. This is attempted by tipping the enclosure. Rolling through the opening is rarely the path of least resistance, and the ball will usually roll to either side around the opening. The removal of the ball is further hampered by interference from any additional ball, and by various geometric characteristics of the enclosures, such as the curvature and slope of inside surfaces.

The characteristic of the rim edge to restrain the ball at the edge of the opening provides intrigue for the user, mentally challenging and stimulating them. Geometric characteristics of the enclosure can encourage the ball to roll to the opening with the edge curvature subsequently restraining it on the edge, thereby enticing the user.

Six ball toy embodiments of the present invention are disclosed. Three of these are intended for children (baby, toddler, child) and three for cats (spherical, modified spherical, torroidal). They are distinguished as follows;

The baby toy consists of a transparent torroidal enclosure having one small arcuate rimmed opening on each side, and containing one ball.

The toddler toy consists of a transparent cylindrical enclosure having one small arcuate rimmed opening on each end, and containing two balls.

The child toy consists of a transparent semi-spherical enclosure having one small arcuate rimmed opening on the bottom and containing two balls.

The spherical cat toy consists of a translucent semi-spherical enclosure having one large arcuate rimmed opening on the top and containing one ball.

The modified spherical cat toy consists of a translucent semi-spherical enclosure having one large arcuate rimmed opening on the top and one smaller arcuate rimmed opening at the bottom and containing one ball.

The torroidal cat toy consists of a translucent torroidal enclosure having one annular arcuate rimmed opening on the top and containing one ball.

DRAWING FIGURES

Figure 7:
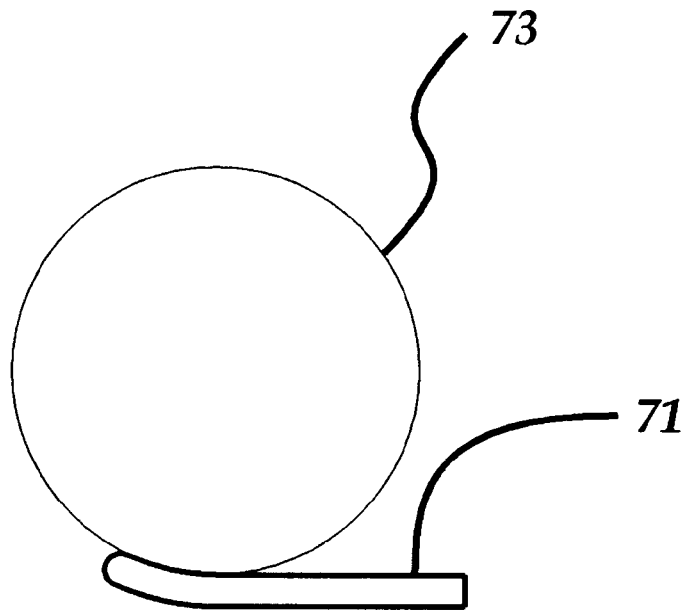
Figure 7:
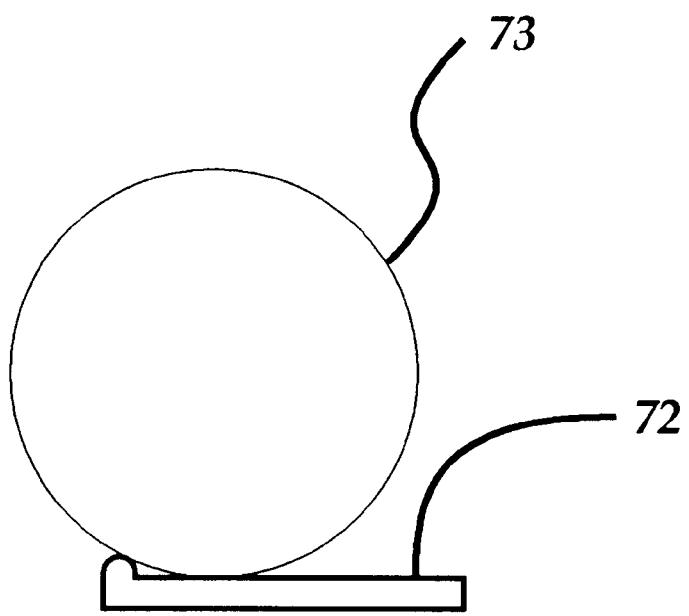

FIG. 7 is a cross sectional detail of an arcuate rim edge 71 and a stepped rim edge 72 restraining a ball 73.

PREFERRED EMBODIMENT DESCRIPTIONS

FIGS. 1 through 6 of the drawings depict preferred embodiments of the invention for purposes of illustration only. Alternative embodiments of the structures and methods illustrated herein may be employed without departing from the invention.

Baby Toy Description

Figure 1A:
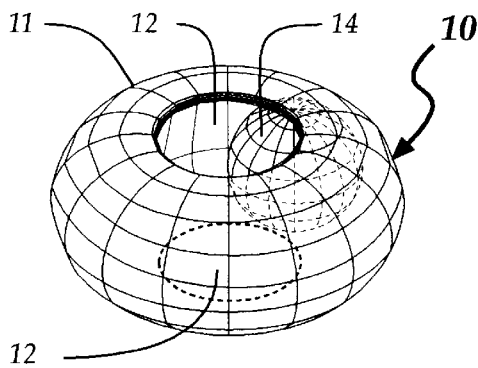
FIG. 1a is a perspective view of baby toy embodiment 10 of the present invention.
Figure 1B:
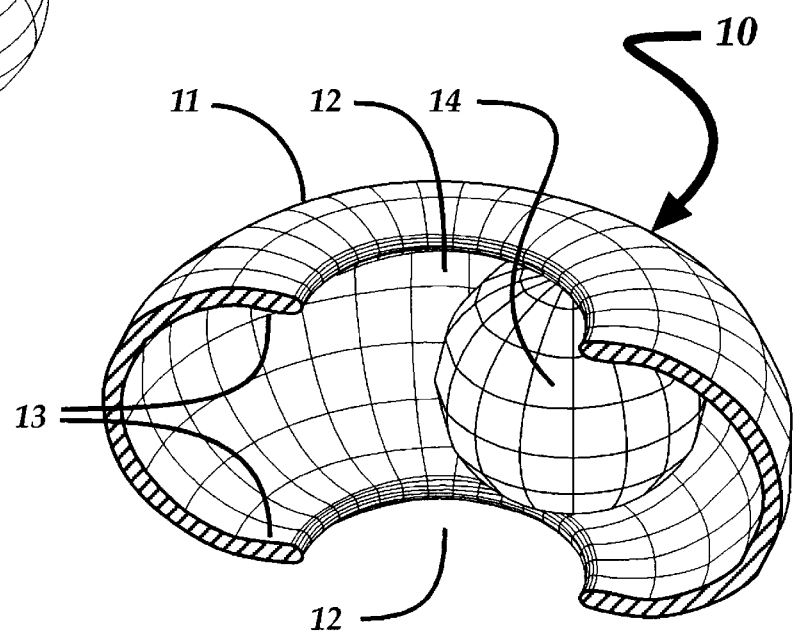
FIG. 1b is a perspective cross-sectional view of baby toy 10.
Figure 1C:
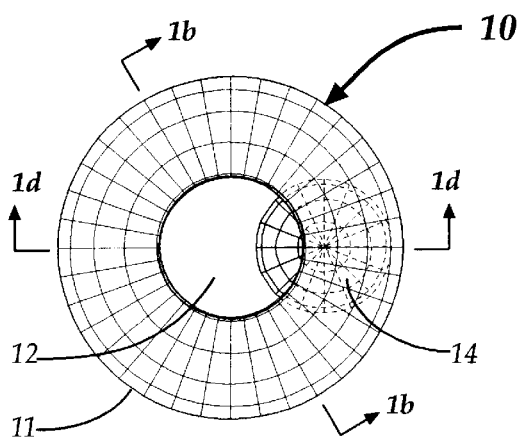
FIG. 1c is a top view of baby toy 10.
Figure 1D:
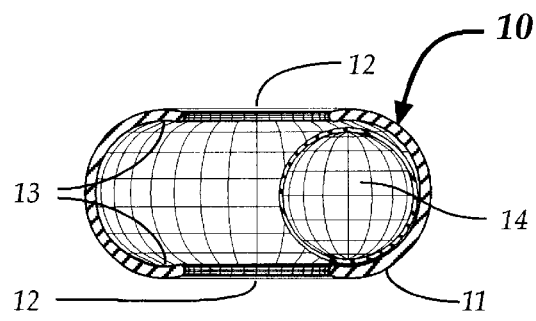
FIG. 1d is a cross-sectional view of baby toy 10.

FIG. 1a is a perspective view of baby toy embodiment 10 of the present invention. Baby toy 10 consists of transparent or translucent plastic cross sectionally arcuate annular rim 11 having two ball passage holes 12, and containing one ball 14. FIG. 1b is a perspective cross-sectional view of baby toy 10 illustrating annular rim 11, passage holes 12 defined by inwardly projecting rim edges 13, and ball 14. Rim edges 13 have a radius of curvature slightly larger than the radius of ball 14. The curvature of rim edges 13 at holes 12 extends inward 18 degrees toward each other and the interior of the space defined by annular rim 11. The diameter of ball 14 is 97% of the distance between rim edges 13 and 97% of the diameter of passage holes 12. FIG. 1c is a top view of baby toy 10 illustrating plastic annular rim 11, ball passage holes 12, and ball 14. FIG. 1d is a cross-sectional view of baby toy 10 illustrating annular rim 11, ball passage holes 12, projecting rim edges 13, and ball 14.

Baby Toy Operation

The operational objective of the baby toy is to stimulate the baby as the ball rolls around within the rim, with the surprise of occasional ball removal. As the baby handles the toy the ball is always present within the holes. The baby can touch it, roll it around, and try to grab it. The baby turns the toy about repeatedly in an effort to roll the ball out through a hole. The inwardly arcing sides of the rim edges prevent the ball from rolling out, and the small space inhibits the ball from being bounced out. If the toy is grasped through one of the holes and rattled, the grasping hand blocks passage of the ball. If the toy is grasped on it's sides with both hands and rattled horizontally, the ball is likely to pass through the lower hole eventually. The combination of the arcing rim edges around each hole and the small space reduces the likelihood of successfully evacuating a ball in a rolling or rattling manner to almost zero. It is not likely a baby will remove the ball very often. However, a dexterous adult can remove the ball by rattling the toy horizontally, thereby demonstrating the challenging possibility to the baby.

Toddler Toy Description

Figure 2A:
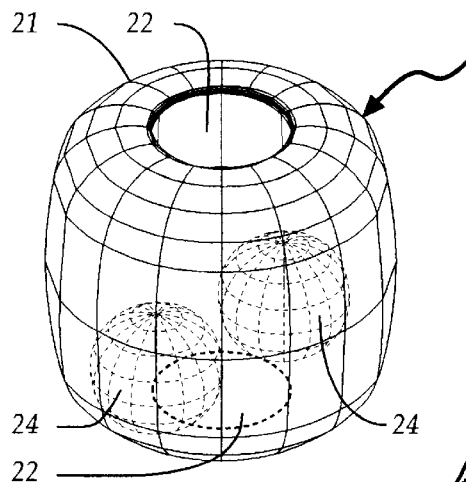
FIG. 2a is a perspective view of toddler toy embodiment 20 of the present invention.
Figure 2B:
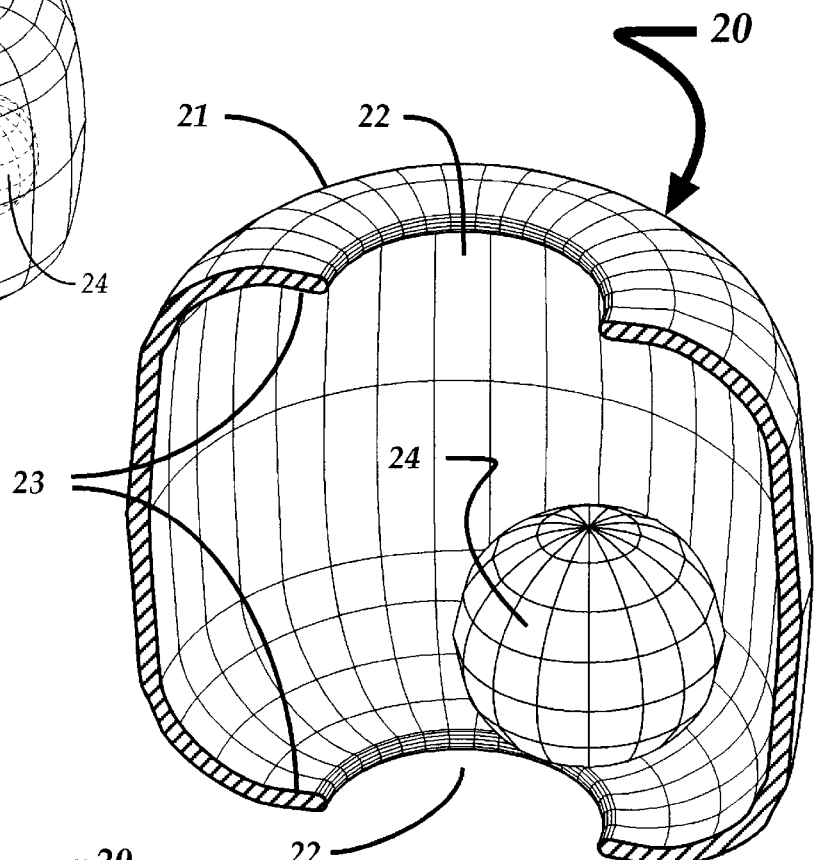
FIG. 2b is a perspective cross-sectional view of toddler toy 20.
Figure 2C:
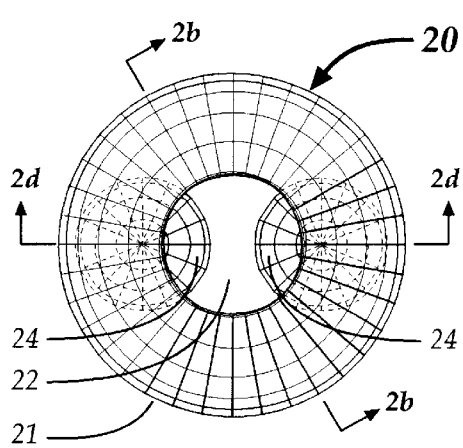
FIG. 2c is a top view of toddler toy 20.
Figure 2D:
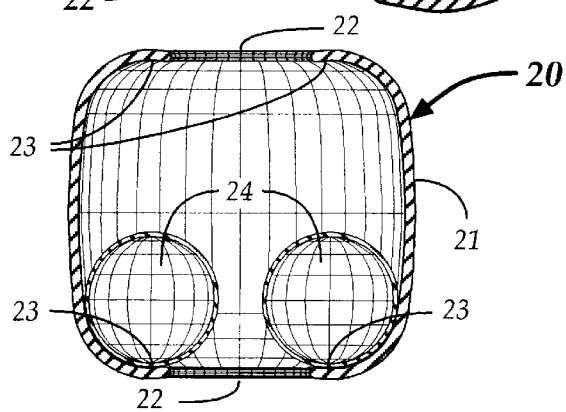
FIG. 2d is a cross-sectional view of toddler toy 20.

FIG. 2a is a perspective view of toddler toy embodiment 20 of the present invention. Toddler toy 20 consists of cylindrical transparent or translucent plastic enclosure 21 having two ball passage holes 22, and containing two balls 24. FIG. 2b is a perspective cross-sectional view of toddler toy 20 illustrating enclosure 21, ball passage holes 22 defined by inwardly projecting rim edges 23, and one of two balls 24. Rim edges 23 have a radius equal to the radius of balls 24. The curvature of rim edges 23 at holes 22 extends inward 12 degrees past horizontal toward the interior of enclosure 21. The diameter of balls 24 is 97% of the diameter of passage holes 22. FIG. 2c is a top view of toddler toy 20 illustrating plastic enclosure 21, ball passage holes 22, and balls 24. FIG. 2d is a cross-sectional view of toddler toy 20 illustrating enclosure 21, ball passage holes 22, projecting rim edges 23, and balls 24. The juxtaposition of balls 24 illustrates the hole passage interference created by each ball to the other.

Toddler Toy Operation

The operational objective of the toddler toy is to remove one or both balls. Toddlers have a natural tendency to try and do this. If the toy is turned about repeatedly in an effort to roll one of the balls out through a hole, the rim edge initially prevents a ball from rolling out. When the other ball falls and both are aside the hole the interference each creates for the other prevents either from passing through the hole. The combination of the rim edge around each hole and the interference provided by the other ball reduces the likelihood of successfully evacuating a ball in a rolling manner to almost zero. If the toddler's hands are small enough they can reach in and grab a ball. However, when they attempt to withdraw their arm, their ball grasping hand no longer fits through the hole. If the child considers it, the ball can be pushed out through the other hole. If the enclosure is grasped through one of the holes and rattled, a ball is likely to pass through the other hole eventually. If the enclosure is grasped on it's sides with both hands and rattled, a ball is also likely to pass through one of the holes eventually. The likelihood of successfully evacuating a ball in this rattling manner is directly related to the frequency and duration of the rattling. With only one ball remaining in the enclosure it is still quite difficult to roll or rattle it out.

Child Toy Description

Figure 3A:
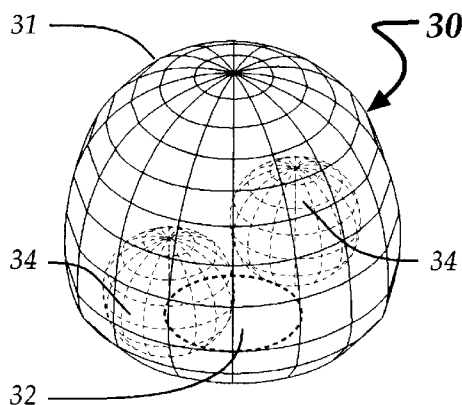
FIG. 3a is a perspective view of child toy embodiment 30 of the present invention.
Figure 3B:
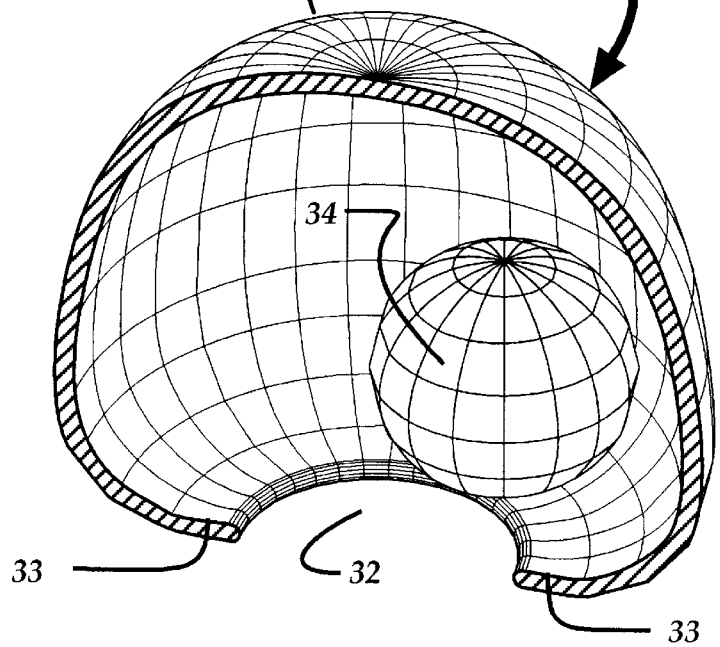
FIG. 3b is a perspective cross-sectional view of child toy 30.

FIG. 3a is a perspective view of child toy embodiment 30 of the present invention. Child toy 30 consists of transparent or translucent plastic enclosure 31 composed of a cross sectionally arcuate annular rim combined circumferentially with a paraboloid, having ball passage hole 32, and two balls 34. FIG. 3b is a perspective cross-sectional view of child toy 30 illustrating enclosure 31, ball passage hole 32 defined by inwardly projecting rim edge 33, and one of two balls 34.

Figure 3C:
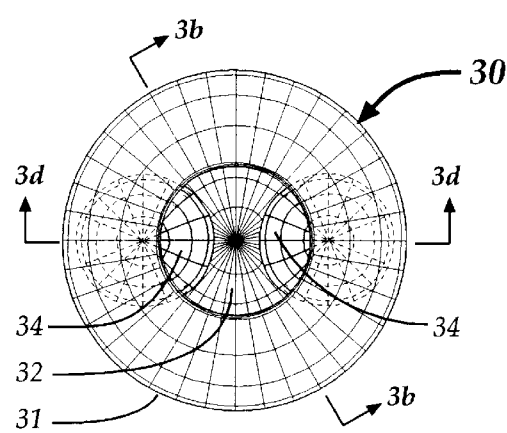
FIG. 3c is a bottom view of child toy 30.
Figure 3D:
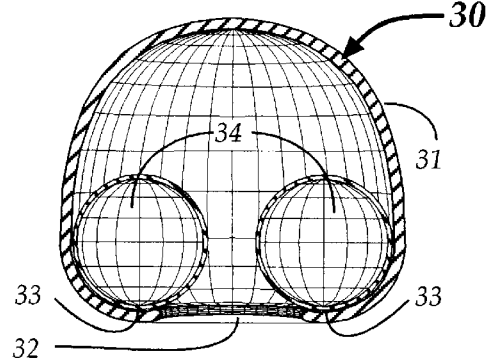
FIG. 3d is a cross-sectional view of child toy 30.

Rim edge 33 has a radius equal to the radius of balls 34. The curvature of rim edge 33 at hole 32 extends upward 12 degrees past horizontal toward the interior of enclosure 31. The diameter of balls 34 is 97% of the diameter of passage hole 32. FIG. 3c is a bottom view of child toy 30 illustrating plastic enclosure 31, ball passage hole 32, and balls 34. FIG. 3d is a cross sectional view of child toy 30 illustrating enclosure 31, ball passage hole 32, projecting rim edge 33, and balls 34. The juxtaposition of balls 34 illustrates the hole passage interference created by each ball to the other.

Child Toy Operation

The operational objective of the child toy is the same as the toddler toy. However, it is much harder to remove any of the balls from the child toy. The likelihood of rolling a ball out is reduced by the elimination of one hole. Also, the nature of the spherical end places the balls astride the hole every time the enclosure is turned hole down. If the enclosure is grasped through the one hole and rattled, a ball will never pass through that hole as it is obstructed by the hand. If the child's hands are small enough they can reach in and grab a ball. However, when they attempt to withdraw their arm they encounter the same toddler toy problem of their grasping hand not fitting. In this case there is no other hole to push the ball out through. If the enclosure is grasped on it's sides with both hands and rattled, a ball is likely to pass through the one hole eventually. However, the geometry of the spherical end is such that it directs the balls to the sides of the hole. The likelihood of successfully evacuating a ball from the child toy is very low. It is still possible and appears to the child that the balls should come out. This apparent possibility maintains their interest.

Spherical Cat Toy Description

Figure 4A:
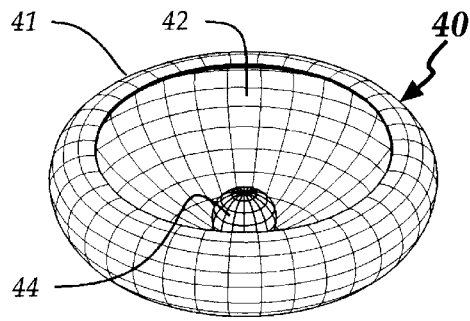
FIG. 4a is a perspective view of spherical cat toy embodiment 40 of the present invention.
Figure 4B:
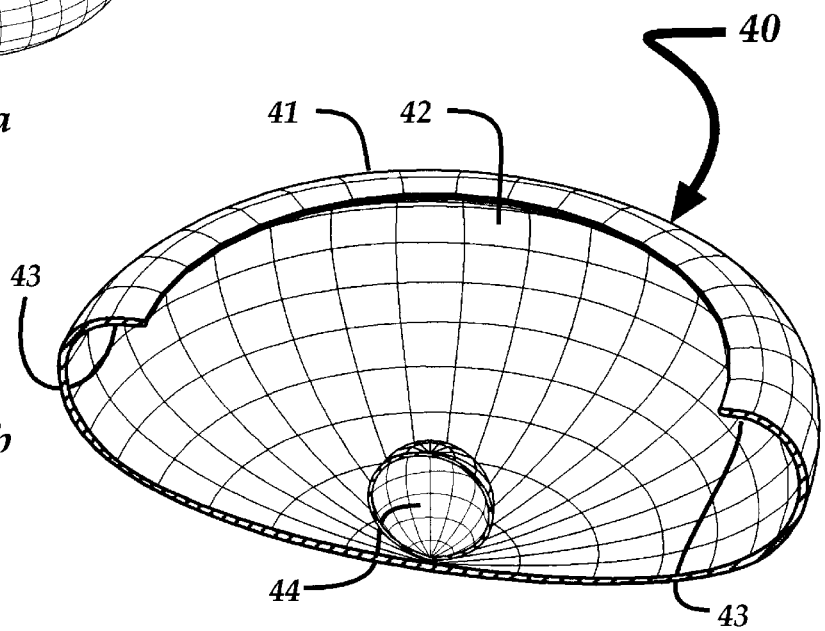
FIG. 4b is a perspective cross-sectional view of spherical cat toy 40.
Figure 4C:
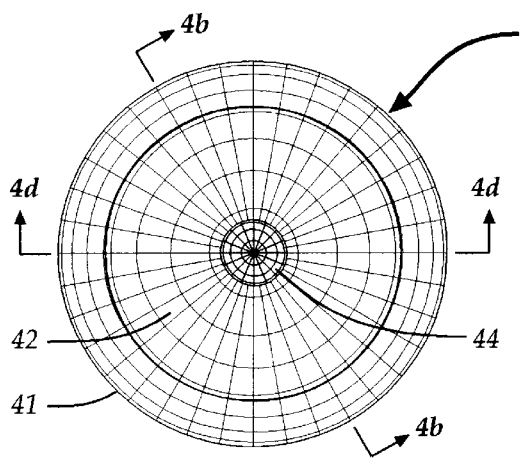
FIG. 4c is a top view of spherical cat toy 40.
Figure 4D:
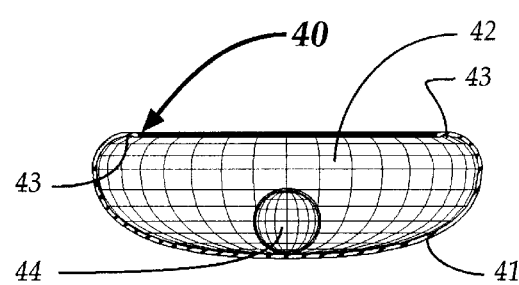
FIG. 4d is a cross-sectional view of spherical cat toy 40.

FIG. 4a is a perspective view of spherical cat toy embodiment 40 of the present invention. Spherical cat toy 40 consists of transparent or translucent plastic enclosure 41 composed of a cross sectionally arcuate annular rim combined circumferentially with a paraboloid, having ball passage hole 42, and one ball 44. FIG. 4b is a perspective cross-sectional view of spherical cat toy 40 illustrating enclosure 41, ball passage hole 42 defined by inwardly projecting rim edge 43, and ball 44. Rim edge 43 has a radius equal to the radius of ball 44. The curvature of rim edge 43 at hole 42 extends downward 12 degrees past horizontal toward the interior of enclosure 41. The diameter of ball 44 is 23% of the diameter of passage hole 42. FIG. 4c is a top view of spherical cat toy 40 illustrating plastic enclosure 41, ball passage hole 42, and ball 44. FIG. 4d is a cross sectional view of spherical cat toy 40 illustrating enclosure 41, ball passage hole 42, rim edge 43, and ball 44.

Spherical Cat Toy Operation

The operational objective of the spherical cat toy is to remove the one ball. This is preferably a non-resilient hollow perforated sphere containing some attractive substance such as catnip. As the cat paws and swats the ball, the enclosure rocks, rolls, spins, and slides about on the floor. This action alters the velocity and direction of the ball. Whenever the ball reaches the rim edge of the enclosure it is restrained and rolls back toward the center. The enclosure geometry has a low center of gravity. It is very stable with strong self righting tendencies. Even with the enclosure tipped to very high angles relative to the floor the rim edge restrains the ball. The ball returns to the center as the enclosure rights itself. If the enclosure is completely turned over it is still possible the ball will be contained within the rim edge. The ball will remain within the rim edge until the enclosure is righted and it rolls back toward the center. The ball can be removed from the enclosure if the cat flips the edges or otherwise rattles the enclosure rapidly. During the course of play the enclosure will be rocking and rolling and sliding about the floor. This action provides some opportunity for the ball to be removed. When the ball has been removed the cat can be rewarded with free play before the ball is returned to the enclosure. Before and during play a person can remove the ball, play with the cat and ball, and subsequently return the ball to the enclosure, thereby enticing the cat.

Modified Spherical Cat Toy Description

Figure 5A:
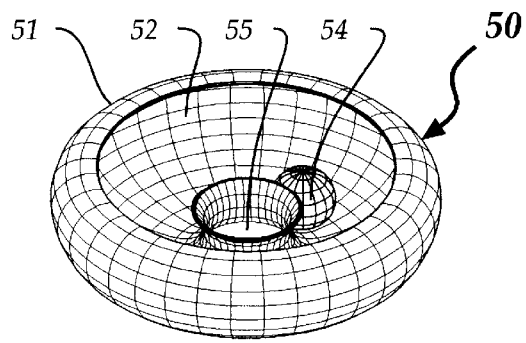
FIG. 5a is a perspective view of modified spherical cat toy embodiment 50 of the present invention.
Figure 5B:
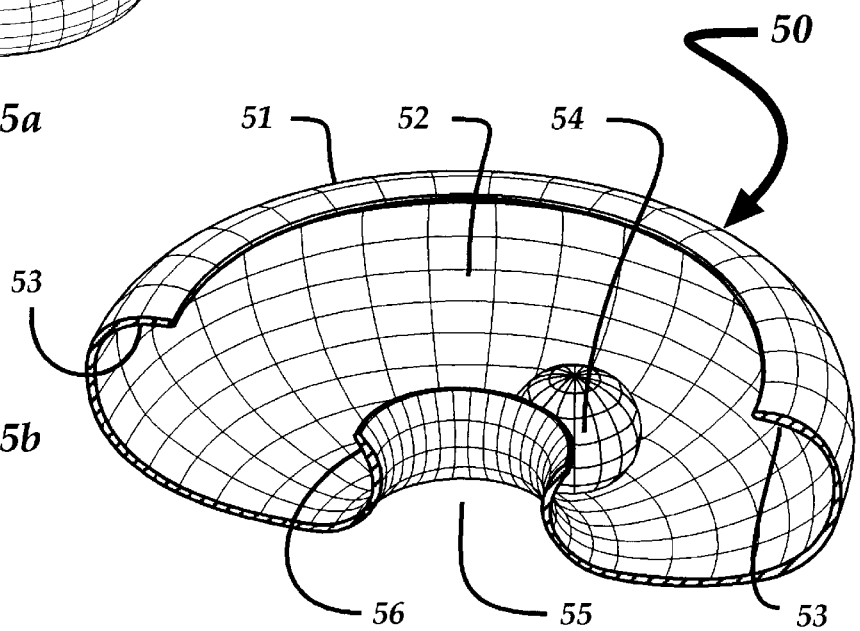
FIG. 5b is a perspective cross-sectional view of modified spherical cat toy 50.
Figure 5C:
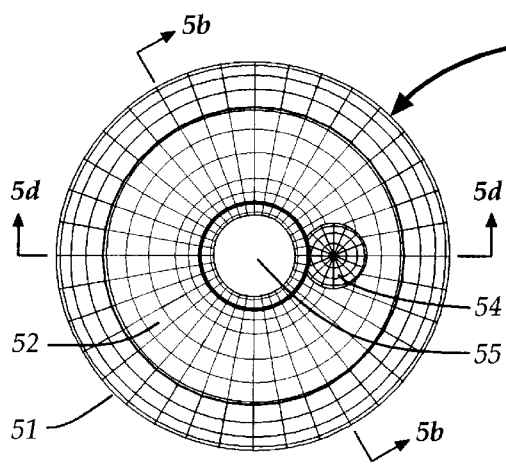
FIG. 5c is a top view of modified spherical cat toy 50.
Figure 5D:
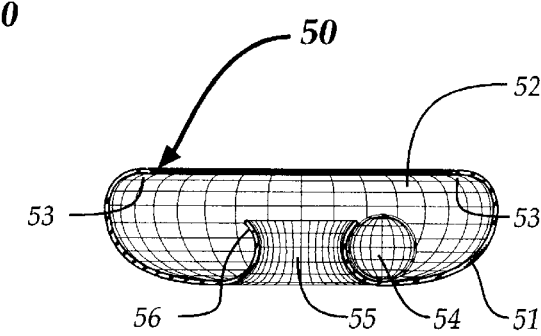
FIG. 5d is a cross-sectional view of modified spherical cat toy 50.

FIG. 5a is a perspective view of modified spherical cat toy embodiment 50 of the present invention. Modified spherical cat toy 50 consists of a transparent or translucent plastic enclosure 51 composed of a cross sectionally arcuate annular rim combined circumferentially with a perforated paraboloid, having ball passage holes 52 and 55, and one ball 54. FIG. 5b is a perspective cross-sectional view of modified spherical cat toy 50 illustrating enclosure 51, ball passage hole 52 defined by inwardly projecting rim edge 53, ball 54, and base hole 55 defined by upwardly projecting rim edge 56. Rim edges 53 and 56 have radii equal to the radius of ball 54. The curvature of rim edge 53 at hole 52 extends downward 12 degrees past horizontal toward the interior of enclosure 51. The curvature of rim edge 56 at hole 55 extends outward 46 degrees past vertical toward the exterior of enclosure 51. The diameter of ball 54 is 23% of the diameter of passage hole 52 and 80% of the diameter of base hole 55. FIG. 5c is a top view of modified spherical cat toy 50 illustrating plastic enclosure 51, ball passage hole 52, rim edges 53 and 56, ball 54, and base hole 55. FIG. 5d is a cross sectional view of modified spherical cat toy 50 illustrating enclosure 51, ball passage hole 52, rim edges 53 and 56, ball 54, and base hole 55.

Modified Spherical Cat Toy Operation

The operational objective of the modified spherical cat toy is the same as the regular spherical cat toy. The addition of the base hole causes the ball to rest in different places rather than always in the center. The modified spherical cat toy also has a generally flat bottom and doesn't rock as easily. As the cat paws and swats the ball, the enclosure spins, and slides about on the floor altering the velocity and direction of the ball. Whenever the ball reaches the rim edge of the enclosure it is restrained and rolls back toward and around the inside rim edge. The enclosure geometry has a low center of gravity and a generally flat bottom. It is very stable with strong self righting tendencies. Even with the enclosure tipped to very high angles relative to the floor the rim edge restrains the ball. The ball returns to the inside rim edge as the enclosure rights itself. If the enclosure is completely turned over it is still possible the ball will be contained within the rim edge. The ball will remain within the rim edge until the enclosure is righted and it rolls back toward the inside. The ball can be removed from the enclosure if the cat flips the edges, rattles the enclosure rapidly, or swats the ball into the base hole. During the course of play the enclosure will be sliding about the floor providing some opportunity for the ball to be removed. As with the regular spherical cat toy when the ball is removed the cat can be rewarded with free play before the ball is returned to the enclosure.

Torroidal Cat Toy Description

Figure 6A:
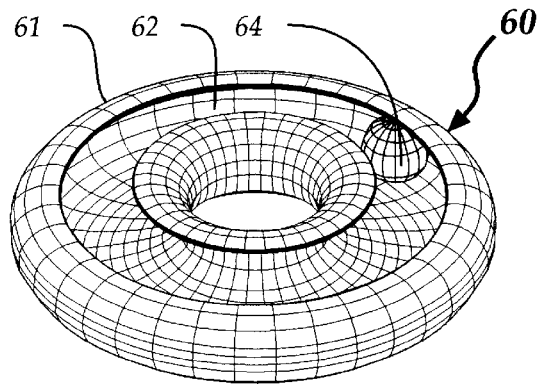
FIG. 6a is a perspective view of torroidal cat toy embodiment 60 of the present invention.
Figure 6B:
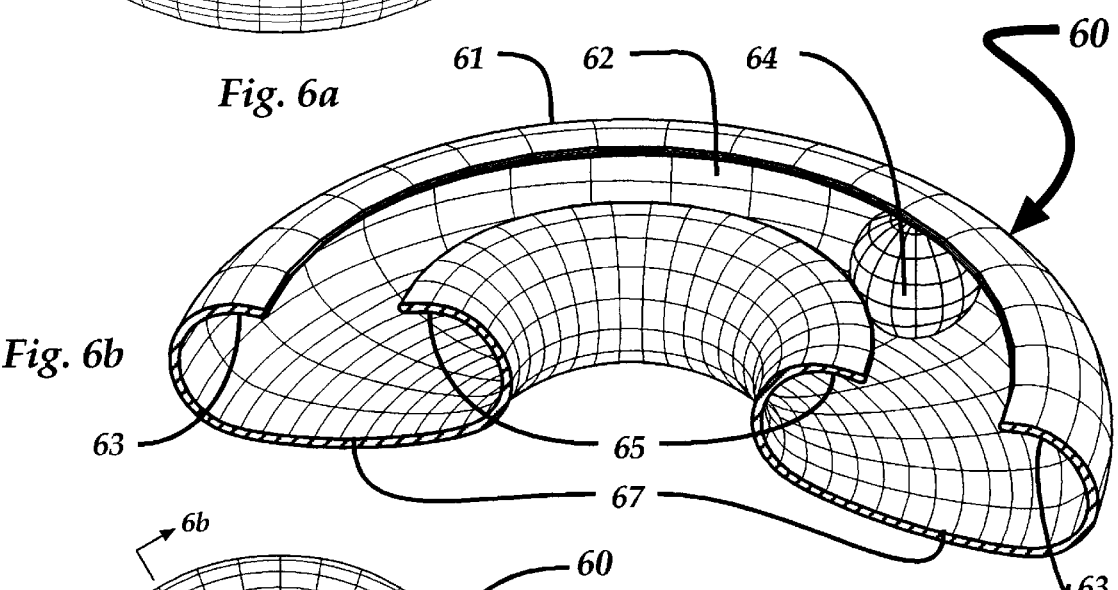
FIG. 6b is a perspective cross-sectional view of torroidal cat toy 60.
Figure 6C:
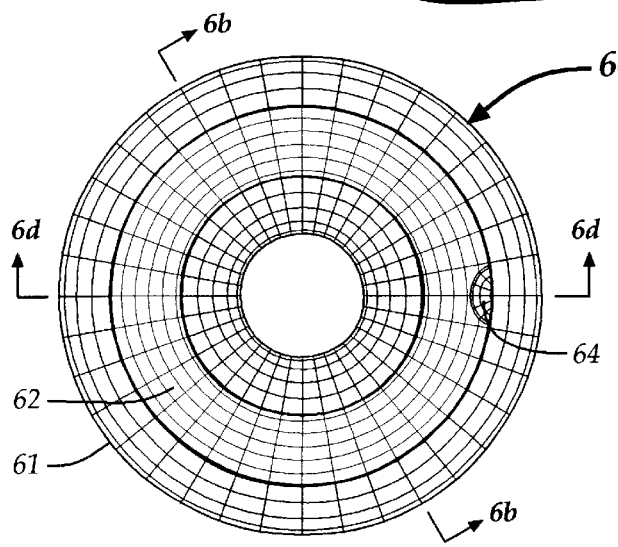
FIG. 6c is a top view of torroidal cat toy 60.
Figure 6D:
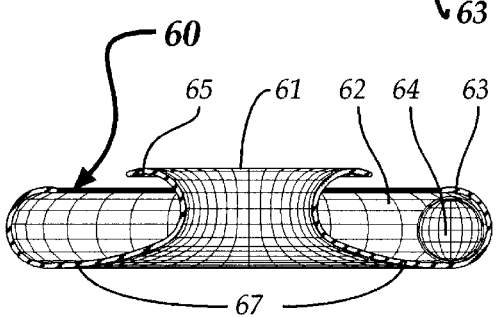
FIG. 6d is a cross-sectional view of torroidal cat toy 60.

FIG. 6a is a perspective view of torroidal cat toy embodiment 60 of the present invention. Torroidal cat toy 60 consists of cross sectionally arcuate torroidal translucent plastic enclosure 61 having annular opening 62, and containing ball 64. FIG. 6b is a perspective cross-sectional view of torroidal cat toy 60 illustrating enclosure 61, annular opening 62 defined by outside rim edge 63 and inside rim edge 65, and containing ball 64. Rim edges 63 and 65 have radii equal to the radius of ball 64. The curvature of outside rim edge 63 at opening 62 extends downward 12 degrees past horizontal toward floor 67 of enclosure 61. The curvature of inside rim edge 65 at opening 62 extends downward 24 degrees past horizontal toward floor 67 of enclosure 61. The diameter of ball 64 is 97% of the width of opening 62. Floor 67 of enclosure 61 is sloped down to the outside 12 degrees past horizontal. FIG. 6c is a top view of torroidal cat toy 60 illustrating plastic enclosure 61, opening 62, and ball 64. FIG. 6d is a cross sectional view of torroidal cat toy 60 illustrating enclosure 61, opening 62, rim edges 63 and 65, ball 64 and sloped enclosure floor 67.

Torroidal Cat Toy Operation

The operational objective of the torroidal cat toy is the removal of the ball. Despite the large open area which the ball will freely pass through it is unlikely a cat will swat the ball out. As the cat paws and swats the ball, it rolls around the enclosure. Because of the angled floor of the enclosure the ball will roll to the outside where it is contained by the outside arcuate rim edge. In instances where the cat works the ball toward the inside of the enclosure, the inside arcuate rim edge will contain it. The ball can be removed from the enclosure if the cat flips the edges or otherwise rattles the enclosure rapidly. During the course of play the enclosure will be sliding about the floor providing some opportunity for the ball to be removed.

CONCLUSION RAMIFICATIONS, AND SCOPE

While the above description contains many specifics, these should not be construed as limitations on the scope of the invention, but rather as examples of preferred embodiments thereof. Many other embodiments are possible without departing from the scope of the invention. The projecting rim edge may be arcuate as described, or may consist of a simple step. FIG. 7 illustrates the functional similarities between an arcuate rim edge 71, and a stepped rim edge 72, in restraining a ball 73. The number and shape of enclosure openings can vary considerably. Different materials and combinations of materials can be used. Different enclosure geometries can be combined. Many different basic enclosure shapes are possible. The full scope of the invention should not be determined from the examples given, but from the appended claims and their legal equivalents.

I claim:

1. A ball retrieval toy for a child or animal comprising;
    a hollow globoid enclosure having a concavely curved interior surface, said enclosure perforated by at least one generally circular opening;
    at least one ball, contained within said enclosure, having a diameter slightly smaller than the diameter of said opening; and a cross-sectionally curved, interiorly concaved, annular track incorporated into the structure of said enclosure surrounding said opening, the cross sectional curvature of said track having a radius equal to or greater than the radius of said ball, said curvature sloping toward said opening on the outside, wall side, and sloping away from said opening on the inside, opening side, whereby said curvature facilitates said ball rolling toward said opening along the outside slope, and facilitates said ball rolling away from said opening along the inside slope, thereby promoting said ball rolling toward said opening while restraining said ball from rolling through said opening.

2. The toy as in claim 1 wherein said enclosure contains a shape selected from the group consisting of spheroids, ellipsoids, and parabaloids.

3. The toy as in claim 1 wherein said enclosure is composed of transparent or translucent plastic.

4. The toy as in claim 1 wherein the enclosure geometry hampers passage of said ball through said opening.

5. The toy as in claim 1 wherein said ball is non-resilient and hollow.

6. The toy as in claim 1 wherein said enclosure contains a plurality of balls.

7. The toy as in claim 6 wherein said balls obstruct the passage of each other through said opening while more than one ball is on said annular track.

8. The toy as in claim 1 wherein said enclosure contains a plurality of openings.

9. A ball retrieval toy for a child or animal comprising;
    a hollow annular enclosure consisting of a continuous annular member having a generally curved cross-section composed of an inner wall, an outer wall, and a bottom wall, all interiorly concaved and smoothly contoured, which together define a continuous track having a continuous annular top opening, said opening projecting vertically or obliquely away from the center of the annular enclosure;
    at least one ball, contained within said enclosure, having a diameter small enough to pass freely through said top opening; and a pair of cross-sectionally curved, interiorly concaved, annular tracks, each track incorporated respectively into the inner and outer walls surrounding said opening with each track having a connected wall side and an exposed opening side, the cross sectional curvature of each track having a radius equal to or greater than the radius of said ball, said curvature sloping toward said opening along the connected wall sides, and sloping away from said opening along the exposed opening sides, whereby said curvature facilitates said ball rolling toward said opening along the connected wall side slopes, and facilitates said ball rolling away from said opening along the exposed opening side slopes, thereby promoting said ball rolling toward said opening while restraining said ball from rolling through said opening.

10. The toy as in claim 9 wherein said enclosure is composed of transparent or translucent plastic.

11. The toy as in claim 9 wherein said enclosure has a smooth continuous concavely curved interior surface.

12. The toy as in claim 9 wherein said bottom wall slopes toward said outer wall of said enclosure.

13. The toy as in claim 9 wherein said ball is non-resilient and hollow.

14. A ball retrieval toy for a child or animal comprising;
    a cross sectionally curved annular member having an inside rim of lesser diameter and an outside rim of greater diameter, said annular member conjoined circumferentially, at said outside rim, with a hollow generally dome shaped member to form an enclosure having a concavely curved interior surface, said enclosure having one generally circular opening defined by said inside rim of said annular member;
    at least one ball, contained within said enclosure, having a diameter small enough to pass freely through said opening; and a cross-sectionally curved, interiorly concaved, annular track incorporated into the structure of said enclosure surrounding said opening, the cross sectional curvature of said track having a radius equal to or greater than the radius of said ball, said curvature sloping toward said opening on the outside, wall side, and sloping away from said opening on the inside, opening side, whereby said curvature facilitates said ball rolling toward said opening along the outside slope, and facilitates said ball rolling away from said opening along the inside slope, thereby promoting said ball rolling toward said opening while restraining said ball from rolling through said opening.

15. The toy as in claim 14 wherein said enclosure is composed of transparent or translucent plastic.

16. The toy as in claim 14 wherein said enclosure has a smooth continuous concavely curved interior surface.

17. The toy as in claim 14 wherein the enclosure geometry hampers passage of said ball through said opening.

18. The toy as in claim 14 wherein said enclosure contains a plurality of balls.

19. The toy as in claim 18 wherein said balls obstruct the passage of each other through said opening while more than one ball is on said annular track.

20. The toy as in claim 14 wherein said ball is non-resilient and hollow.

* * * * *